(12) United States Patent
Ballard et al.

(10) Patent No.: US 11,258,088 B2
(45) Date of Patent: Feb. 22, 2022

(54) METAL SUPPORTED SOLID OXIDE FUEL CELL UNIT AND ITS METHOD OF MANUFACTURE

(71) Applicant: Ceres Intellectual Property Company Limited, Horsham (GB)

(72) Inventors: Andrew Ballard, Horsham (GB); Tomasz Domanski, Horsham (GB); Jonathan Tunbridge, Horsham (GB); Jon Harman, Horsham (GB); Alan Robertson, Horsham (GB); Diana Duarte, Horsham (GB); Adam Brunton, Horsham (GB)

(73) Assignee: CERES INTELLECTUAL PROPERTY COMPANY LIMITED, Horsham (GB)

(*) Notice: Subject to any disclaimer, the term of this patent is extended or adjusted under 35 U.S.C. 154(b) by 0 days.

(21) Appl. No.: 16/638,458

(22) PCT Filed: Aug. 13, 2018

(86) PCT No.: PCT/GB2018/052295
§ 371 (c)(1),
(2) Date: Feb. 11, 2020

(87) PCT Pub. No.: WO2019/034855
PCT Pub. Date: Feb. 21, 2019

(65) Prior Publication Data
US 2020/0365926 A1 Nov. 19, 2020

(30) Foreign Application Priority Data
Aug. 16, 2017 (GB) .................................... 1713140

(51) Int. Cl.
*H01M 8/1286* (2016.01)
*H01M 8/2404* (2016.01)
(Continued)

(52) U.S. Cl.
CPC ....... *H01M 8/1286* (2013.01); *H01M 8/0232* (2013.01); *H01M 8/1097* (2013.01);
(Continued)

(58) Field of Classification Search
CPC ............ H01M 8/1286; H01M 8/2404; H01M 8/2432; H01M 8/2483
See application file for complete search history.

(56) References Cited

U.S. PATENT DOCUMENTS 10,270,119 B2 4/2019 Leah et al.
2003/0203272 A1 10/2003 Kelly et al.
(Continued)

FOREIGN PATENT DOCUMENTS

EP 1 439 592 A2 7/2004
EP 1 889 650 A1 2/2008
(Continued)

OTHER PUBLICATIONS

International Preliminary Report on Patentability for International Patent Application No. POT/GB2018/052295, dated Feb. 27, 2020.
(Continued)

*Primary Examiner* — Olatunji A Godo
(74) *Attorney, Agent, or Firm* — SGPatents PLLC

(57) ABSTRACT

The present invention relates to an improved metal supported solid oxide fuel cell unit, fuel cell stacks, fuel cell stack assemblies, and methods of manufacture.

20 Claims, 11 Drawing Sheets

Figure 1:
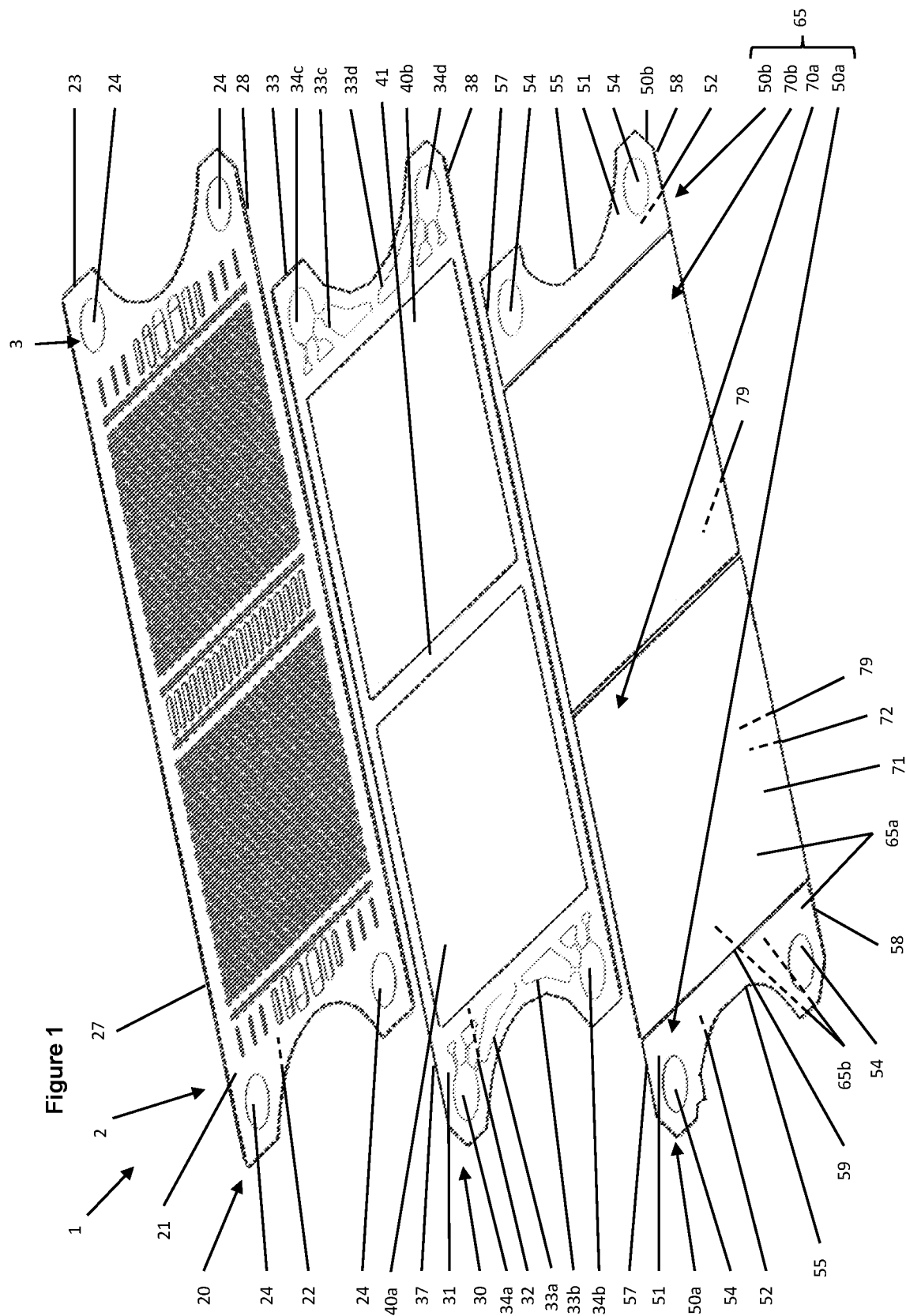

(51) Int. Cl.
*H01M 8/2432* (2016.01)
*H01M 8/2483* (2016.01)
*H01M 8/0232* (2016.01)
*H01M 8/1097* (2016.01)
*H01M 8/12* (2016.01)

(52) U.S. Cl.
CPC ....... *H01M 8/2404* (2016.02); *H01M 8/2432* (2016.02); *H01M 8/2483* (2016.02); *H01M 2008/1293* (2013.01)

(56) References Cited

U.S. PATENT DOCUMENTS

| | | | |
|---|---|---|---|
| 2004/0265667 A1 | 12/2004 | Kato et al. | |
| 2005/0153188 A1* | 7/2005 | Schenk | H01M 8/0206 429/442 |
| 2015/0086886 A1 | 3/2015 | Blank et al. | |
| 2016/0380298 A1* | 12/2016 | Leah | H01M 8/04082 429/465 |

FOREIGN PATENT DOCUMENTS

| | | |
|---|---|---|
| EP | 2 859 606 B1 | 8/2016 |
| GB | 2 400 723 A | 10/2004 |
| KR | 2013-0075992 A | 7/2013 |
| RU | 2303838 C2 | 7/2007 |
| RU | 2328060 C1 | 6/2008 |
| RU | 2534021 C2 | 11/2014 |
| WO | WO 2005/034277 A1 | 4/2005 |
| WO | WO 2007/021280 A1 | 2/2007 |
| WO | WO 2007/085863 A1 | 8/2007 |
| WO | WO 2008/132493 A2 | 11/2008 |
| WO | WO 2012/040253 A1 | 3/2012 |
| WO | WO 2013/186222 A1 | 12/2013 |

OTHER PUBLICATIONS

International Search Report for International Patent Application No. PCT/GB2018/052295, dated Oct. 25, 2018.
International Preliminary Report on Patentability for International Patent Application No. PCT/GB2018/052296, dated Feb. 27, 2020.
International Search Report for International Patent Application No. PCT/GB2018/052296, dated Jan. 31, 2019.
Search Report for GB Patent Application No. 1813194.6, dated Jan. 10, 2019.
Search Report for GB Patent Application No. 1813195.3, dated Jan. 11, 2019.
U.S. Appl. No. 16/638,459, filed Feb. 11, 2020.
Non-Final Office Action dated May 27, 2021, in U.S. Appl. No. 16/638,459.
Search Report from Russian Patent Application No. 2020110705, dated Nov. 30, 2021.
Office Action from Taiwan Patent Application No. 107128195, dated Nov. 24, 2021.
Search Report from Taiwan Patent Application No. 107128195, dated Nov. 24, 2021.

* cited by examiner

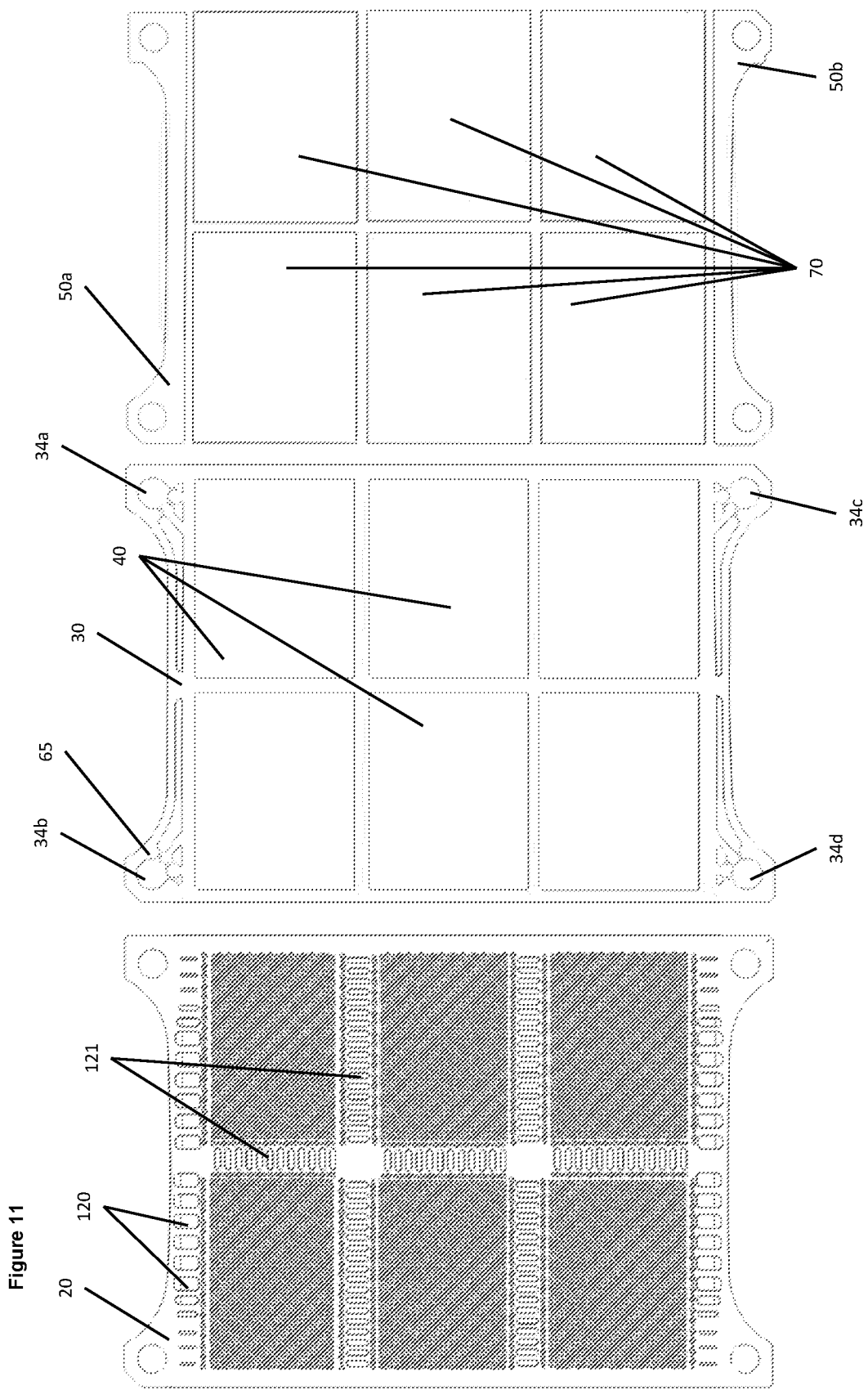

METAL SUPPORTED SOLID OXIDE FUEL CELL UNIT AND ITS METHOD OF MANUFACTURE

SCOPE OF THE INVENTION

The present invention relates to an improved metal supported solid oxide fuel cell unit, fuel cell stacks, fuel cell stack assemblies, and methods of manufacture.

BACKGROUND OF THE INVENTION

Teachings of fuel cells, fuel cell stacks, fuel cell stack assemblies, and heat exchanger systems, arrangements and methods are well known to one of ordinary skill in the art, and in particular include WO02/35628, WO03/07582, WO2004/089848, WO2005/078843, WO2006/079800, WO2006/106334, WO2007/085863, WO2007/110587, WO2008/001119, WO2008/003976, WO2008/015461, WO2008/053213, WO2008/104760, WO2008/132493, WO2009/090419, WO2010/020797, WO2010/061190, WO2015/004419, WO2015/136295, WO2016/124929, WO2016/124928, WO2016/128721 and WO2016/083780. All publications referenced herein and their references are incorporated herein by reference in their entirety. Definition of terms used herein can be found as necessary in the above publications.

Fuel cell stacks, fuel cell stack assemblies, fuel cell units including fuel cell stack layers), and the arrangement of fuel cells within a fuel cell stack unit and fuel cell stack layer are well known.

As the desired power output of fuel cell units increases, there is a need to increase the size of fuel cell units, and the fuel cell or fuel cells within them. However, increasing the size of fuel cell units (e.g. fuel cell stack layers) can result in mechanical instability. Movement, particularly flexing, of fuel cell stack units can result in mechanical damage to the fuel cell(s) within them and decreased efficiency/power output and operational lifespan. This movement/flexing can also reduce the gas seal around the fuel cell unit/fuel cell stack layer, and reduce electrical conductivity, particularly between individual fuel cell unit(s) and the components they form an electrical circuit with.

These problems are increased in fuel cell stack assemblies comprising a plurality of fuel cell units in the form of fuel cell stack layers. Where it is desired to increase the power output of a fuel cell stack assembly by increasing the number of fuel cell stack layers, or by increasing the size of individual fuel cell stack layers, problems can be encountered. These problems can include maintaining even compression throughout the stack to retain a gas-tight seal and achieve an acceptable electrical resistance between fuel cell stack layers and adjacent components.

The present invention seeks to improve upon the prior art.

SUMMARY OF THE INVENTION

According to a first aspect of the present invention, there is provided a metal supported solid oxide fuel cell unit comprising:
  a) a plurality of metal substrate plates and at least two blanking plates, each metal substrate plate defining first and second opposed surfaces and each blanking plate defining first and second opposed surfaces, wherein at least one solid oxide fuel cell is disposed on said second surface of each metal substrate plate;
  b) a metal spacer, which defines first and second opposed surfaces, said metal spacer comprising an external perimeter and a plurality of cut-out internal perimeters, each cut-out internal perimeter defining a cut-out, wherein said first surface of each metal substrate plate and said first surface of each blanking plate is attached to said second surface of said metal spacer, each cut-out internal perimeter of said metal spacer being wholly overlapped by a metal substrate plate; and
  c) a metal interconnect plate which defines first and second opposed surfaces, said second surface of said metal interconnect plate sealingly attached to said first surface of said metal spacer.

The terms "disposed on" and "attached to" are used interchangeably herein.

Preferably, the metal supported solid oxide fuel cell unit is a fuel cell stack layer, more preferably a metal supported solid oxide fuel cell stack layer. Thus, a plurality of fuel cell units may be assembled to form a solid oxide fuel cell stack.

Preferably, each metal substrate plate (also referred to as a "fuel cell plate") comprises at least one porous region. Preferably, the at least one porous region is surrounded by a non-porous region. More preferably, each metal substrate plate comprises one porous region. More preferably, each metal substrate region comprises a porous region surrounded by a non-porous region. More preferably, the or each porous region is a perforated region. Preferably, it comprises (i.e. is defined by) a plurality of perforations extending from the first surface to the second surface (i.e. between the first surface and the second surface). More preferably, the perforations are laser drilled perforations. Preferably, the non-porous region of each metal substrate plate is attached to the metal spacer.

Preferably, the at least one porous region is coincident with (i.e. extends to, or overlaps) the corresponding cut-out internal perimeter of the metal substrate, i.e. extends to the bound of the cut-out internal perimeter. This is particularly preferable in embodiments where the metal substrate plate comprises a single porous region.

Preferably, each solid oxide fuel cell disposed on a metal substrate plate comprises an anode layer deposited over (bonded to) a porous region of the metal substrate plate, an electrolyte layer deposited over (bonded to) the anode layer, and a cathode layer deposited over the electrolyte layer. More preferably, the electrolyte layer extends over the anode to sealingly attach to the non-porous region of the metal substrate plate surrounding the anode.

The at least two blanking plates and the plurality of metal substrate plates attached to the metal spacer together define a metal substrate (also referred to as a "substrate layer" or "metal substrate layer") attached to the metal spacer. Thus, each fuel cell unit comprises a metal substrate, a metal spacer, and a metal interconnect plate.

The metal substrate plates are preferably disposed between and on the same plane as the blanking plates. The blanking plates are preferably of a generally rectangular shape. Preferably, each blanking plate comprises at least one internal perimeter (a "fuel port internal perimeter") defining a fuel port, i.e. defining at least one fuel port. More preferably, each blanking plate defines two fuel ports.

Preferably, the metal substrate plates and the blanking plates do not contact one another, i.e. do not abut one another. Thus, preferably a blanking plate (such as a first blanking plate) does not abut or contact an adjacent metal substrate plate (such as a first metal substrate plate). Thus, preferably adjacent metal substrate plates do not abut or contact one another. Thus, preferably a second blanking plate does not abut or contact an adjacent second metal substrate plate.

By having the blanking plates and metal substrate plates attached to the metal spacer, and not having them abutting or contacting one another, this allows for a "tolerance gap" to be defined between them, and allows for variability in the positioning of the components during the manufacturing process. This provides a significant technical advantage in terms of the manufacturing process and can e.g. assist in an increased manufacturing process speed, reduced cost, increased reliability of the fuel cell unit, and/or increased lifespan of the fuel cell unit.

Preferably, the blanking plates are metal blanking plates. More preferably, the blanking plates are made of the same metal as the metal substrate plates. Preferably, the blanking plates are of equal thickness to the metal substrate plates.

Preferably, the metal spacer comprises at least two internal perimeters each defining a fuel port. More preferably, each metal spacer defines two fuel ports at a first end (preferably, a fuel inlet end), and two fuel ports at a second end (preferably, an exhaust fuel outlet end). The internal perimeters defining the cut-outs may be considered a first set of internal perimeters, and the internal perimeters defining the fuel ports may be considered a second set of internal perimeters.

Each metal substrate plate is attached wholly overlapping an internal perimeter defining a cut-out i.e. on and over a cut-out. Thus, each metal substrate plate covers a cut-out. Each metal substrate plate is attached to the metal spacer between an at least one cut-out internal perimeter defining a cut-out and the external perimeter of the metal spacer. More preferably, each metal substrate plate is attached to the metal spacer between a cut-out internal perimeter (i.e. one of said cut-out internal perimeters) defining a cut-out and the external perimeter of the metal spacer.

Preferably, the at least two blanking plates and the plurality of metal substrate plates are attached to the metal spacer by welding. More preferably, they are attached to the metal spacer by line welding.

Preferably, each metal substrate plate is attached to the metal spacer between an at least one cut-out internal perimeter defining a cut-out and the external perimeter of the metal spacer. More preferably, each metal substrate plate is attached to the metal spacer between a cut-out internal perimeter (i.e. one of said cut-out internal perimeters) defining a cut-out and the external perimeter of the metal spacer.

Preferably, the metal interconnect plate is sealing attached to the metal spacer by welding.

Preferably, the metal interconnect plate is sealingly attached to the metal spacer along a line disposed between (a) the external perimeter of the metal spacer, and (b) the plurality of cut-out internal perimeters of the metal spacer. Preferably, the line is proximal the external perimeter of the metal spacer. More preferably, the line is adjacent the external perimeter of the metal spacer. More preferably, the line is within 10 mm, more preferably within 5 mm, more preferably within 4 mm, more preferably within 3 mm, more preferably within 2 mm of the external perimeter of the metal spacer.

More preferably, the welds attaching the at least two blanking plates and the plurality of metal substrates to the metal spacer, and the weld sealingly attaching the metal interconnect plate to the metal spacer do not overlap.

Preferably, the first surface of each metal substrate plate and the first surface of each blanking plate is disposed on and attached to the second surface of the metal spacer.

Preferably, the second surface of the metal interconnect plate is disposed on and sealingly attached to the first surface of the metal spacer.

Preferably, there are a total of two blanking plates.

Preferably, the metal interconnect plate comprises a plurality of dimples extending outwardly from the first surface, away from the second surface.

Preferably, the metal interconnect plate comprises:
a plurality of dimples extending outwardly from the first surface, away from the second surface, and
a plurality of dimples extending away from the first surface, outwardly from the second surface.

More preferably, the dimples alternate.

In certain embodiments, the fuel cell unit comprises at least one combined metal substrate plate, each combined metal substrate plate comprising a (combined) blanking plate and at least one metal substrate plate. Thus, a base plate and at least one metal substrate plate are attached to one another to form a single component (a combined metal substrate plate), or are integrally formed as a single component from the outset, prior to the combined metal substrate plate being attached to the metal spacer. More preferably, the fuel cell unit comprises two combined metal substrate plates. More preferably, the fuel cell unit comprises a combined metal substrate plate, at least one metal substrate plate, and a blanking plate. Alternatively, the fuel cell unit comprises two combined metal substrate plates, and at least one metal substrate plate.

In embodiments comprising at least one combined metal substrate plate, a combined metal substrate plate preferably does not abut or contact an adjacent metal substrate plate or combined metal substrate plate As well as providing metal substrate plates in a 2×1 series (linear) arrangement between the blanking plates, other arrangements and numbers of metal substrate plates can be provided. For example, metal substrate plates may be provided in a 1×2 (parallel) arrangement between the blanking plates. Alternatively, metal substrate plates may be provided in a 2×2, 3×2 or 4×2 arrangement and the same blanking plates may be used with the various arrangements. Similarly, fuel cell units may be provided with metal substrate plates in 2×3, 3×3 or 4×3 arrangements using the same blanking plates. Blanking plates are dimensioned as appropriate. Other arrangements will be readily apparent.

The use of the plurality of metal substrate plates allows the metal substrate plates to be combined in a modular manner to obtain a range of fuel cell unit sizes and a range of power outputs as desired, including e.g. a larger fuel cell unit size and therefore larger power output. The attachment of the metal substrate plates to the metal spacer can also reduce the likelihood of bending of the fuel cells within the fuel cell unit, therefore decreasing the risk of reduced electrical conductivity and reduced gas sealing that may occur should the fuel cell bend. The use of metal substrate plates also means that a given metal substrate plate can be manufactured and used in a number of different fuel cell unit products. Thus, for example, it could be used in a fuel cell unit which contains just two metal substrate plates. Alternatively, it could be used in a larger fuel cell unit, such as one having 4, 6, 8, 9, 10 or 12 metal substrate plates. This can act to reduce the cost and increase the speed, quality and reliability of manufacture of the metal substrate plate (and its fuel cell).

In various embodiments, two blanking plates are provided, arranged (when attached to the metal spacer) with one at either end of the metal substrate, i.e. one at a first end of the metal substrate, and the other at a second end of the metal substrate. In other embodiments, blanking plates may be split into first and second portions i.e. a first blanking plate portion and a second blanking plate portion. Thus a first blanking plate can comprise a first blanking plate portion and a second blanking plate portion. Similarly, a second blanking plate can comprise a first blanking plate portion and a second blanking plate portion, each blanking plate portion attached to the metal spacer.

The fuel cell unit has internal fuel manifolding. When a plurality of the fuel cell units are assembled into a stack an open manifolded oxidant (air) flow passage is defined between (a) first surface 21 of metal interconnect plate of a first fuel cell unit, and (b) second surfaces of the at least two blanking plates and the plurality of metal substrate plates of an adjacent second fuel cell unit. Preferably, the metal interconnect plate comprises a plurality of dimples extending outwardly from the first surface, away from the second surface. Preferably, the outwardly extending dimples of the interconnect plate of a first fuel cell unit abut the cathode layer of the fuel cells of an adjacent second fuel cell unit and act as a current collector.

The above optional and preferable features are equally applicable to other aspects of the present invention detailed below.

Also provided according to the present invention is a solid oxide fuel cell stack comprising a plurality of metal supported solid oxide fuel cell units according to the present invention.

Also provided according to the present invention is a solid oxide fuel cell stack assembly comprising: a base plate, an end plate, a solid oxide fuel cell stack according to the present invention, and a skirt attached to the base plate and the end plate and defining a volume between the skirt, the base plate and the end plate within which is contained the fuel cell stack.

Also provided according to the present invention is a method of assembly of a metal supported solid oxide fuel cell unit, the metal supported solid oxide fuel cell unit comprising:
  a) a plurality of metal substrate plates and at least two blanking plates, each metal substrate plate defining first and second opposed surfaces and each blanking plate defining first and second opposed surfaces, wherein at least one solid oxide fuel cell is disposed on the second surface of each metal substrate plate;
  b) a metal spacer, which defines first and second opposed surfaces, the metal spacer comprising an external perimeter and a plurality of cut-out internal perimeters, each cut-out internal perimeter defining a cut-out; and
  c) a metal interconnect plate which defines first and second opposed surfaces;
  said method of assembly comprising the steps of:
  (i) attaching the first surface of each metal substrate plate and the first surface of each blanking plate to the second surface of the metal spacer, wherein each cut-out internal perimeter of the metal spacer is wholly overlapped by a metal substrate plate; and
  (ii) sealingly attaching said second surface of the metal interconnect plate to the first surface of said metal spacer.

Preferably, step (i) comprises clamping the metal spacer to the at least two blanking plates and the plurality of metal substrate plates and attaching the metal spacer to the at least two blanking plates and the plurality of metal substrate plates.

Preferably, step (ii) comprises clamping the metal interconnect plate to the metal spacer and attaching the metal interconnect plate to the metal spacer.

Preferably, at least one of step (i) and step (ii) comprises attaching by welding. More preferably, both steps (i) and (ii) comprise attaching by welding.

Preferably, the plurality of metal substrate plates and the plurality of blanking plates is aligned with the metal spacer and aligned with the metal interconnect plate.

Preferably, locating means (also referred to as positioning means) are used to locate the various components during the assembly process. Suitable location means include datum edges, fixed dowels, and sprung dowels. Other location means will be readily apparent to one of ordinary skill in the art.

Preferably, the solid oxide fuel cell unit is assembled by attaching the metal substrate plates and blanking plates to the metal spacer so that each metal substrate plate is attached over the cut-out in the metal spacer. The at least two blanking plates and plurality of metal substrate plates and the metal spacer are preferably clamped together using a first clamping plate. Preferably, the at least two blanking plates and the plurality of metal substrate plates are positioned on a base plate, and the metal spacer plate is positioned over them. Preferably, a first clamping plate is positioned over the metal spacer. More preferably, clamping means clamps the at least two blanking plates and plurality of metal substrate plates and the metal spacer between the base plate and the first clamping plate. More preferably, the first clamping plate defines welding slots through which the blanking plates and metal substrate plates are welded to the metal spacer.

Preferably, the metal interconnect plate is attached to the metal spacer by welding. Preferably, the metal interconnect plate is placed over the metal spacer to which the metal substrate plates and blanking plates have already been attached. Preferably, a second clamping plate is positioned over the metal interconnect plate. More preferably, clamping means clamps the at least two blanking plates and plurality of metal substrate plates, the metal spacer, and the metal interconnect plate between the base plate and the second clamping plate. Preferably, the second clamping plate defines an opening. More preferably, the metal interconnect plate is welded to the metal substrate through the opening. Preferably, the welding is between the external perimeters of the metal substrate and the metal interconnect plate, and the internal perimeters of the metal spacer. More preferably, the welding extends through the metal interconnect plate, metal substrate, and through to the at least two blanking plates and the plurality of metal substrate plates.

The at least two blanking plates and the plurality of metal substrate plates attached to the metal spacer together define a metal substrate.

Preferably, the at least two blanking plates, the plurality of metal substrate plates, the metal spacer, and the metal interconnect plate are aligned during assembly by means of a datum edge.

An enabling disclosure of the present invention, to one of ordinary skill in the art, is provided herein. Reference now will be made in detail to embodiments of the invention, one or more examples of which are set forth below. Each example is provided by way of explanation of the invention, not limitation of the invention.

Figure 2:
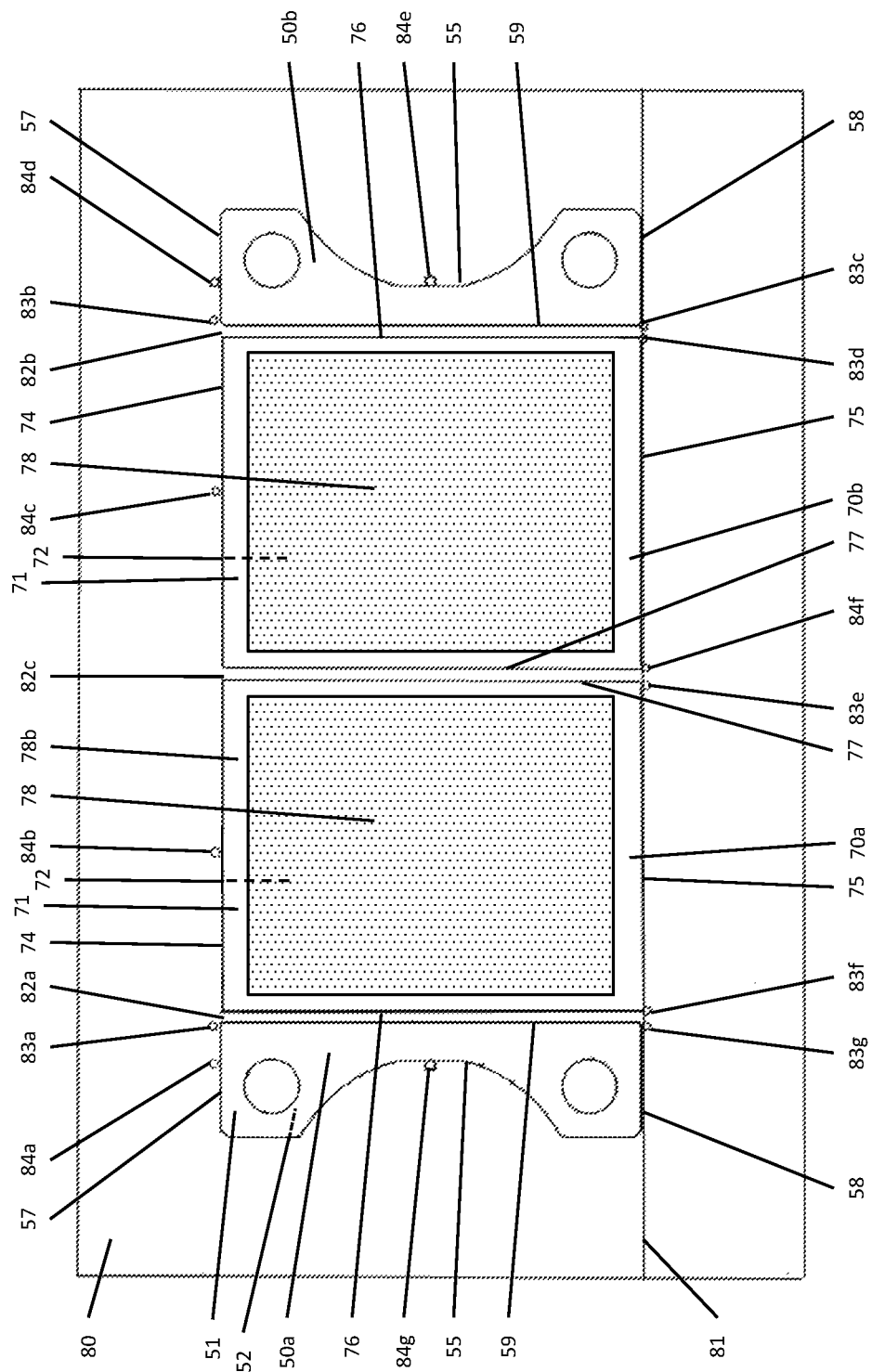

Of the figures:
FIG. 1 shows an exploded perspective view of the fuel cell unit components of Embodiment 1
FIG. 2 shows a top view of metal substrate components located on an assembly baseplate FIG. 3 shows a top view of a metal spacer positioned on top of metal substrate components of FIG. 2

Figure 3:
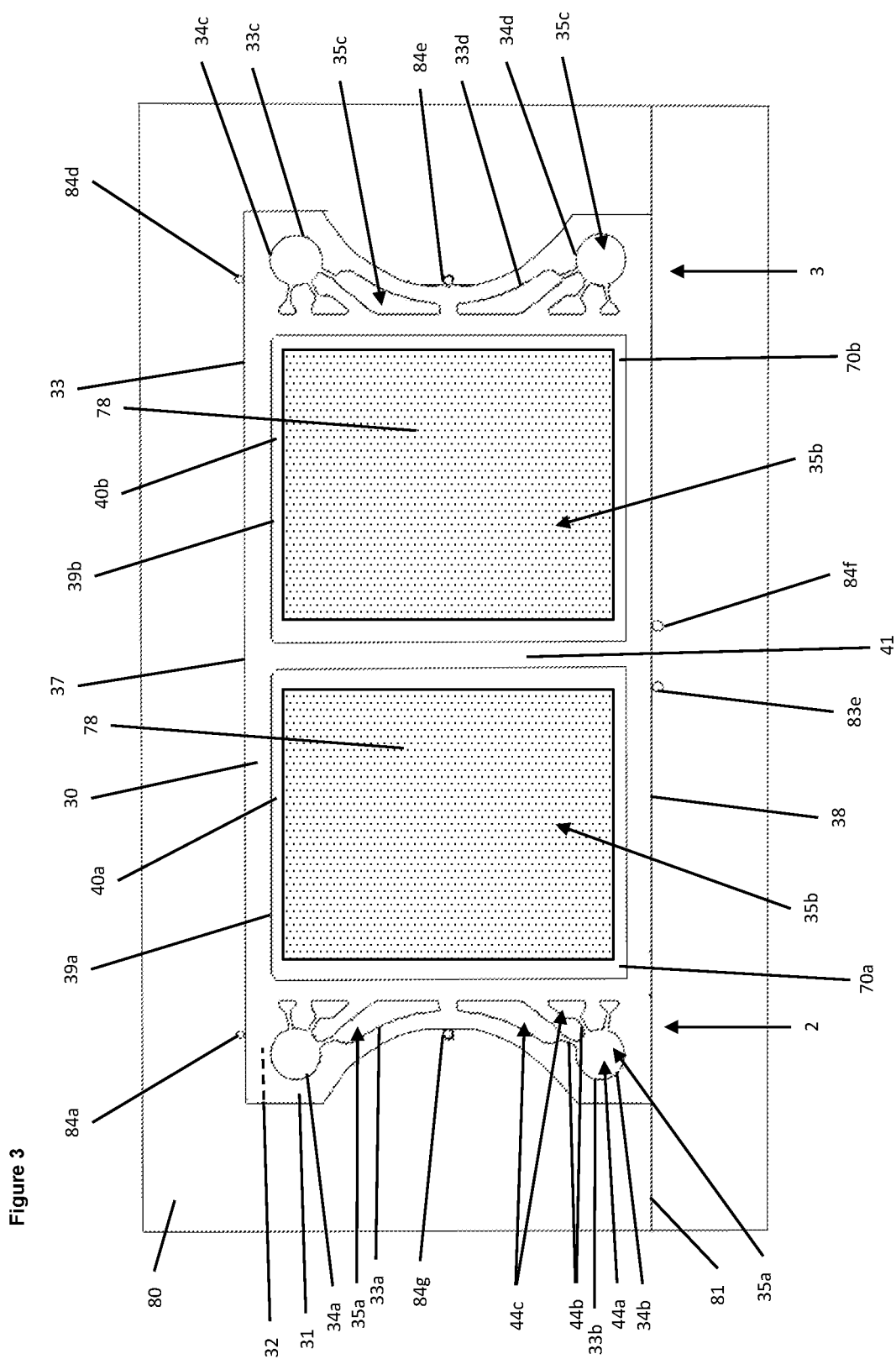
Figure 4:
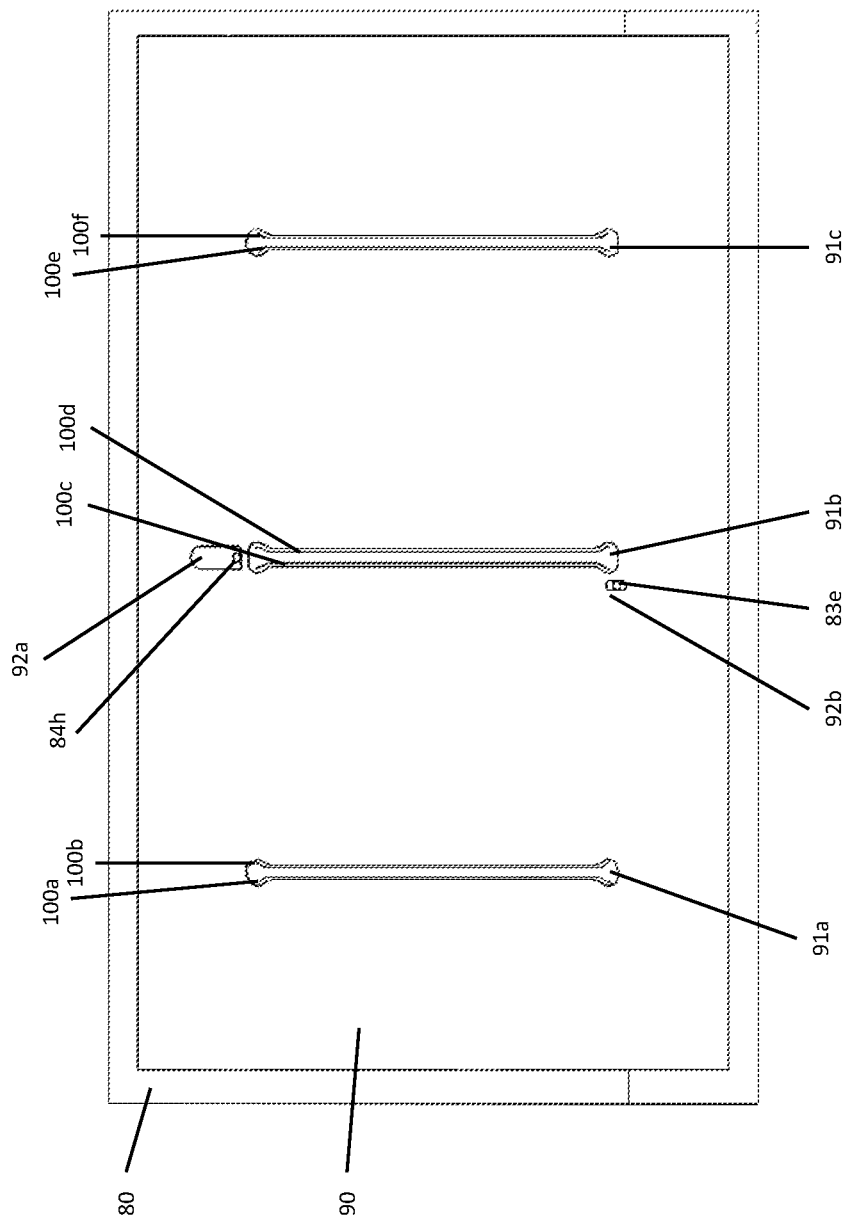
Figure 5:
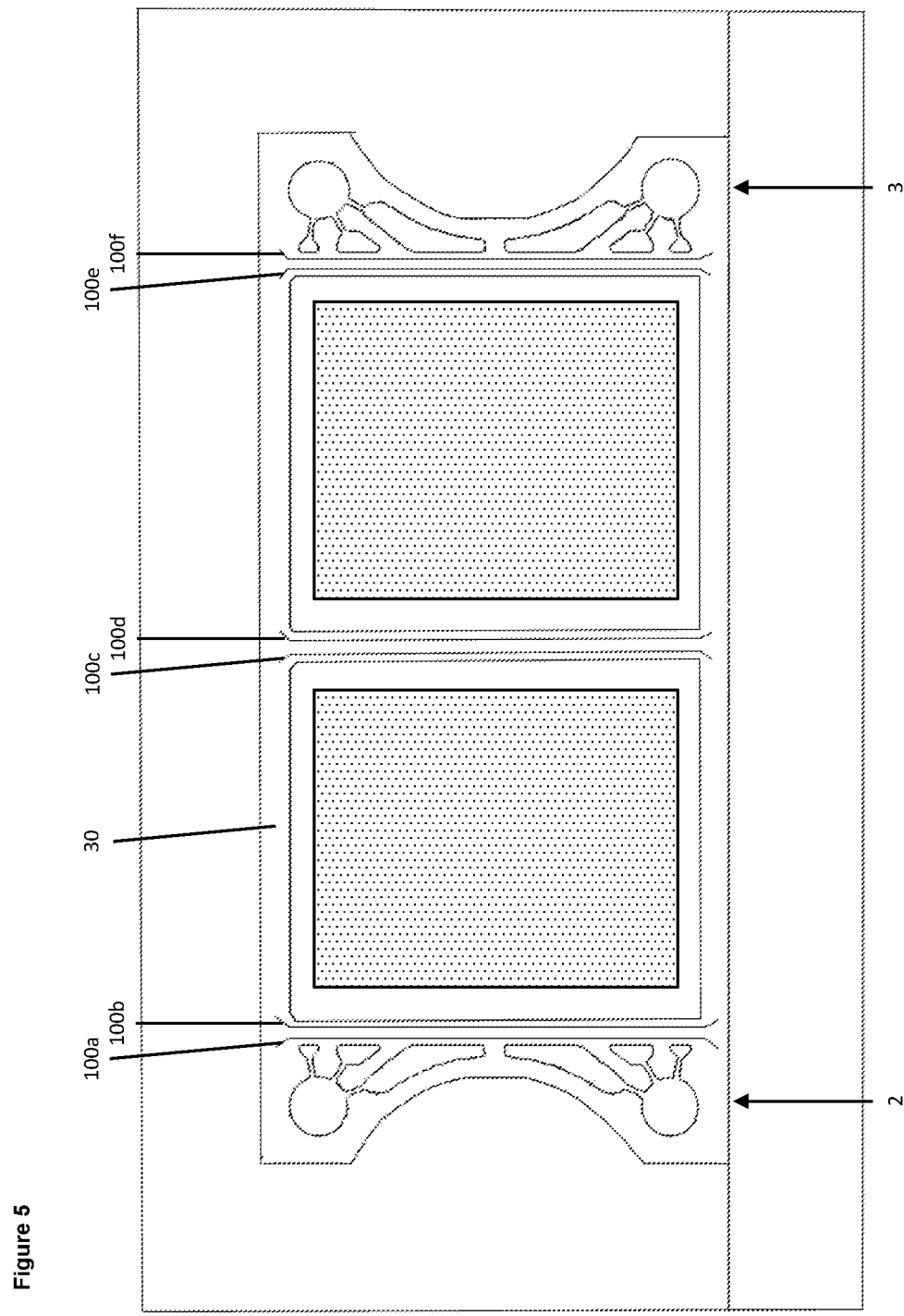
Figure 6:
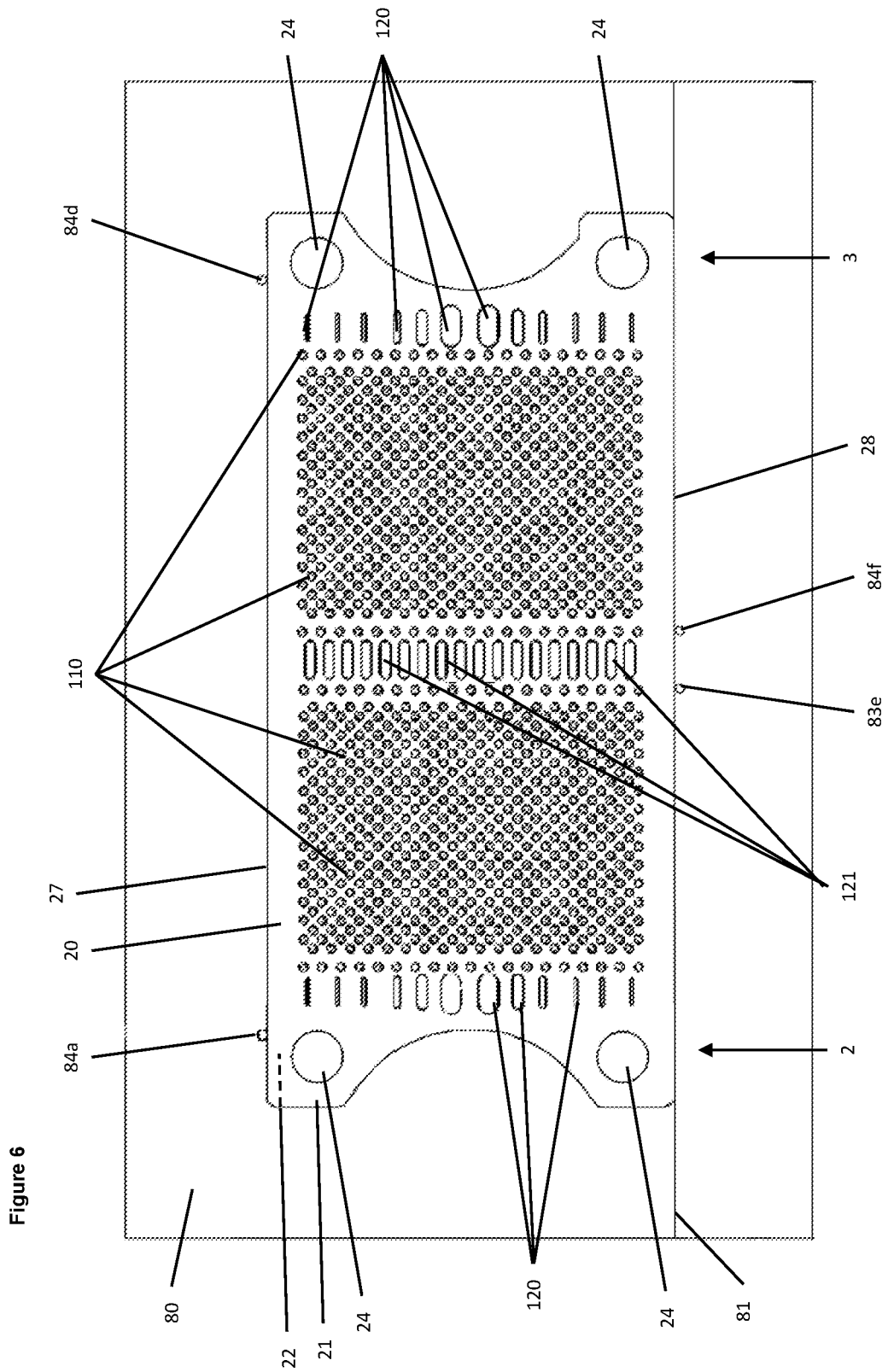

FIG. 4 shows a top view of a first clamping plate positioned on top of the metal spacer of FIG. 3 for welding purposes FIG. 5 shows a top view of the metal spacer of FIG. 3 after welding and removal of the first clamping means FIG. 6 shows a top view of a metal interconnect plate positioned on top of the metal spacer of FIG. 5

Figure 7:
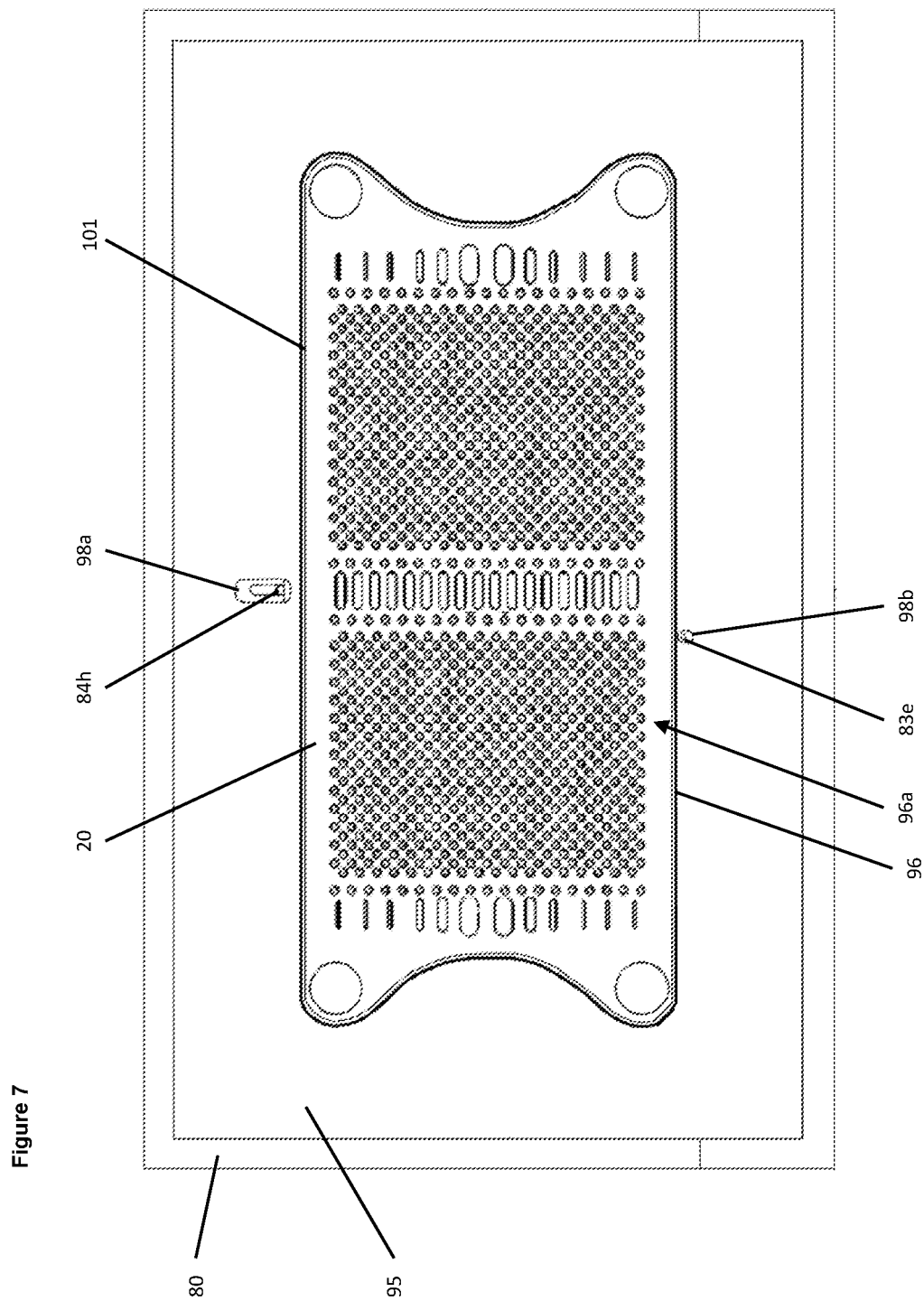
Figure 8:
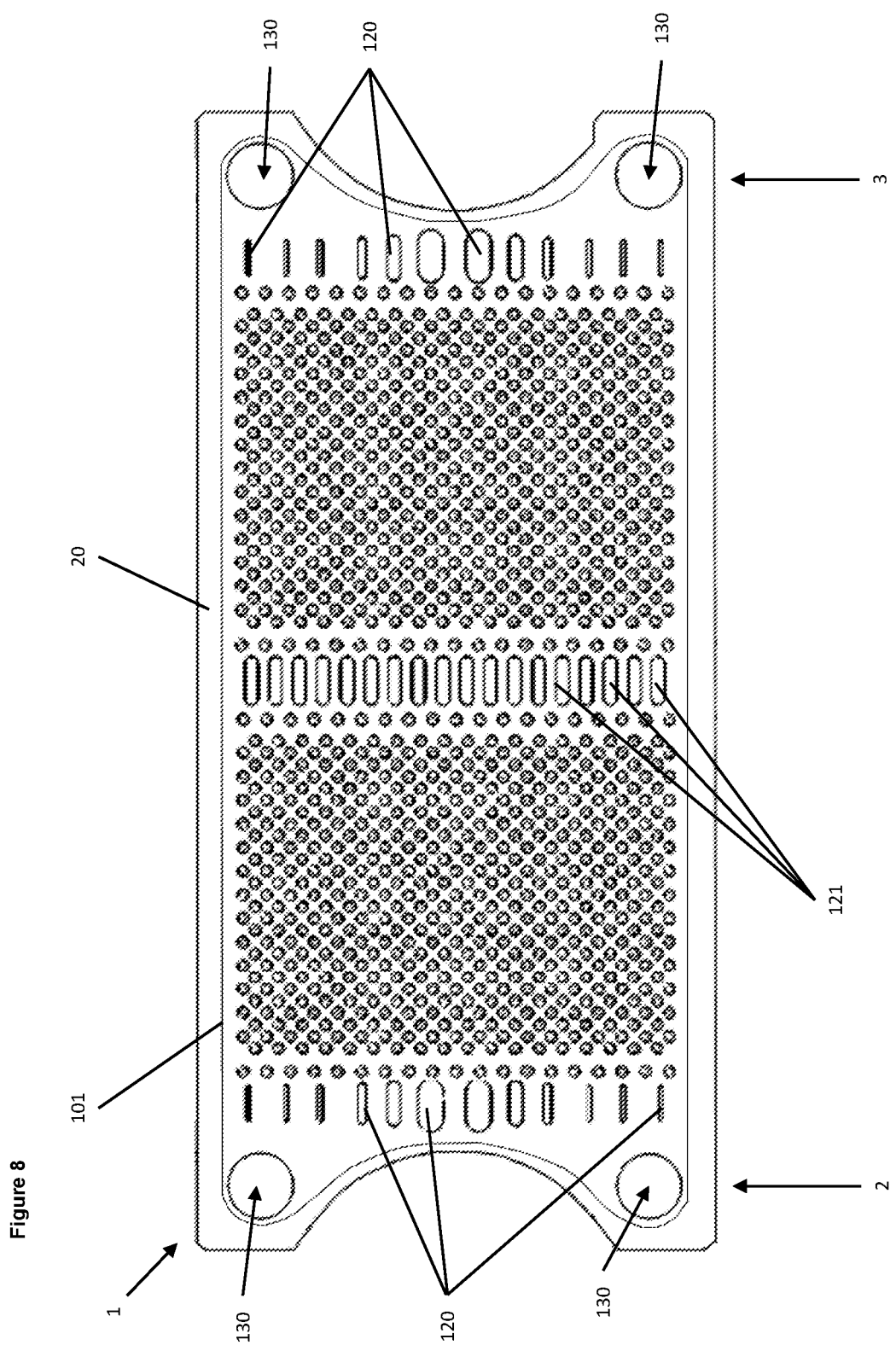
Figure 9:
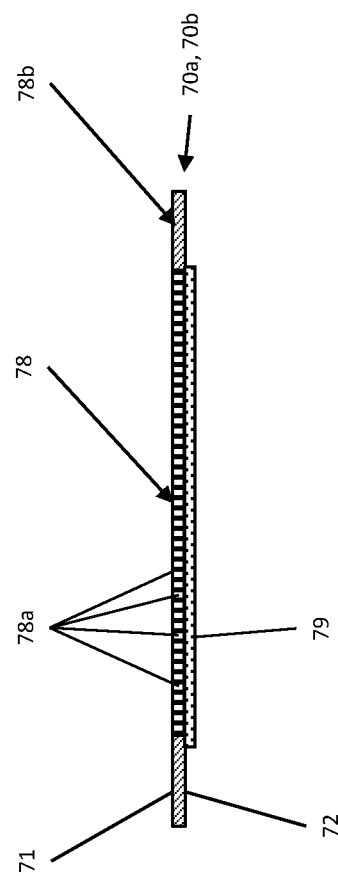
Figure 10:
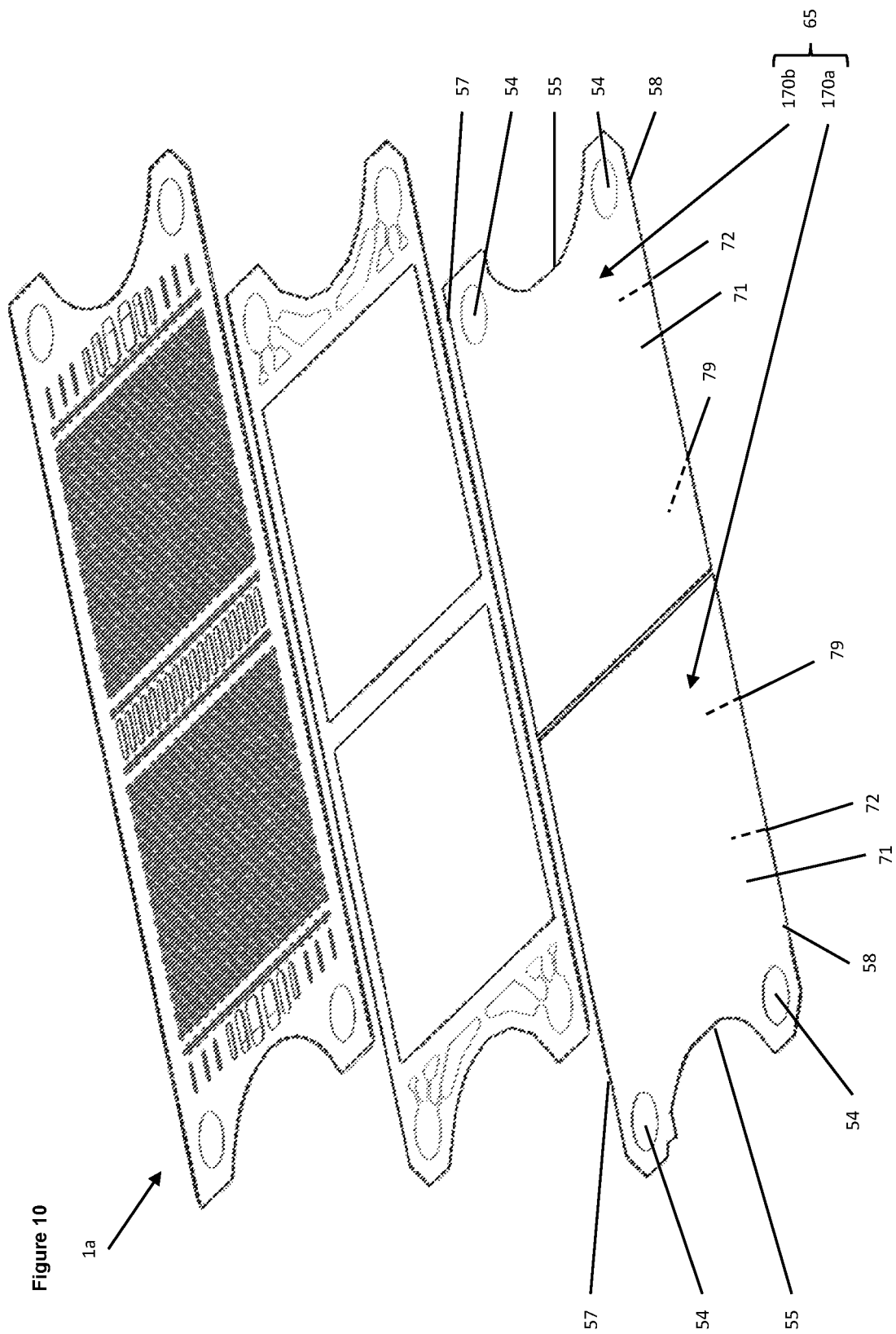

FIG. 7 shows a top view of a second clamping plate positioned on top of the metal interconnect plate of FIG. 6 for welding purposes FIG. 8 shows a top view of the metal interconnect plate of FIG. 6 after welding and removal of the second clamping means and removal from the assembly base plate FIG. 9 shows a cross-section through a metal substrate plate FIG. 10 shows an exploded perspective view of the fuel cell unit components of Embodiment 2

FIG. 11 shows the component parts of the fuel cell unit of Embodiment 4

A list of the reference signs used herein is given at the end of the specific embodiments. Repeat use of reference symbols in the present specification and drawings is intended to represent the same or analogous features or elements.

It will be apparent to those of ordinary skill in the art that various modifications and variations can be made in the present invention without departing from the scope of the appended claims. For instance, features described as part of one embodiment can be used on another embodiment to yield a still further embodiment. Thus, it is intended that the present invention cover such modifications and variations as come within the scope of the appended claims and their equivalents.

Other objects, features, and aspects of the present invention are disclosed in the remainder of the specification. It is to be understood by one of ordinary skill in the art that the present discussion is a description of exemplary embodiments only and is not intended as limiting the broader aspects of the present invention, which broader aspects are embodied in the exemplary constructions.

EMBODIMENT 1

Fabrication of a metal supported solid oxide fuel cell unit 1 is illustrated in the Figures. Metal supported solid oxide fuel cell unit 1 is for use as a solid oxide fuel cell stack layer.

In this embodiment, metal supported solid oxide fuel cell unit 1 is fabricated comprising a metal substrate 65 (also referred to as a "substrate layer" or a "metal substrate layer"), a metal spacer 30, and a metal interconnect plate 20.

Metal substrate plates 70a and 70b each comprise a porous region 78 defined by laser-drilled perforations 78a extending between first surface 71 and second surface 72. Fuel cell 79 is deposited over porous region 78 on second surface 72 of metal substrate plates 70a and 70b, and comprises an anode layer deposited over (bonded to) porous region 78 of metal substrate plate 70a, 70b, an electrolyte layer deposited over (bonded to) the anode layer, and a cathode layer deposited over the electrolyte layer. Porous region 78 is surrounded by non-porous region 78b.

As shown in FIG. 2, assembly baseplate 80 comprises fixed dowels 83a, 83b, 83c, 83d, 83e, 83f, 83g, and spring loaded dowels 84a, 84b, 84c, 84d, 84e, 84f, 84g. Assembly baseplate 80 also defines (comprises) a datum edge 81.

Metal substrate plates 70a and 70b, and blanking plates 50a and 50b are aligned on assembly baseplate 80, and alignment is achieved by fixed dowels 83a, 83b, 83c, 83d, 83e, 83f, 83g, spring loaded dowels 84a, 84b, 84c, 84d, 84e, 84f, 84g, and datum edge 81.

Second surface 52 of blanking plate 50a is disposed on (i.e. contacts/abuts) assembly baseplate 80. Second edge 58 of blanking plate 50a is aligned on datum edge 81 by fixed dowel 83g, and first edge 57 of blanking plate 50a is aligned to fixed dowel 83a and spring loaded dowel 84a. Curved edge 55 of blanking plate 50a is aligned by spring loaded dowel 84g.

Second surface 52 of blanking plate 50b is disposed on (i.e. contacts/abuts) assembly baseplate 80. Second edge 58 of blanking plate 50b is aligned on the datum edge 81 by fixed dowel 83c, and first edge 57 of blanking plate 50b is aligned to fixed dowel 83b and spring loaded dowel 84d. Curved edge 55 of blanking plate 50b is aligned with spring loaded dowel 84e.

Second surface 72 of metal substrate plate 70a is disposed on (i.e. contacts/abuts) assembly baseplate 80.

Metal substrate plates 70a and 70b are positioned on assembly baseplate 80 between blanking plates 50a and 50b. Second short side 75 of metal substrate plate 70a is aligned on datum edge 81 by fixed dowels 83f and 83e. First short side 74 of metal substrate plate 70a is aligned by spring loaded dowel 84b.

Second short side 75 of metal substrate plate 70b is aligned on datum edge 81 by fixed dowel 83d and spring loaded dowel 84f. First short side 74 of metal substrate plate 70b is aligned by spring loaded dowel 84c.

Outer long side 76 of metal substrate plate 70a is aligned parallel to inner edge 59 of the blanking plate 50a, defining a tolerance gap 82a between metal substrate plate 70a and blanking plate 50a.

Outer long side 76 of metal substrate plate 70b is aligned parallel to inner edge 59 of blanking plate 50b, defining a tolerance gap 82b between metal substrate plate 70b and blanking plate 50b.

Tolerance gap 82c is defined between inner long side 77 of metal substrate plate 70a and inner long side 77 of metal substrate plate 70b.

As shown in FIG. 3, metal spacer 30 is then placed on top of blanking plate 50a, metal substrate plate 70a, metal substrate plate 70b and blanking plate 50b.

Second surface 32 of metal spacer 30 is disposed on (i.e. contacts/abuts) first surface 51 of blanking plate 50a, first surface 71 of metal substrate plate 70a, first surface 71 of metal substrate plate 70b, and first surface 51 of blanking plate 50b.

Metal spacer 30 is aligned with blanking plate 50a, metal substrate plate 70a, metal substrate plate 70b and blanking plate 50b by fixed dowel 83e, spring loaded dowels 84a, 84d, 84e, 84f and 84g, and datum edge 81.

Second elongate edge 38 of metal spacer 30 is aligned with datum edge 81 and second edge 58 of blanking plates 50a and 50b and second short sides 75 of metal substrate plates 70a and 70b using fixed dowel 83e and spring loaded dowel 84f. First elongate edge 37 of metal spacer 30 is aligned with first edges 57 of blanking plates 50a and 50b and first short sides 74 of metal substrate plates 70a and 70b using spring loaded dowels 84a and 84d.

The external perimeters of blanking plate 50a, metal substrate plate 70a, metal substrate plate 70b and blanking plate 50b do not extend beyond external perimeter 33 of metal spacer 30.

Metal spacer 30 comprises cut-out internal perimeters 39a and 39b, with each internal perimeter defining a respective cut-out 40a and 40b, and a cross member 41 between them.

Metal substrate plates 70*a* and 70*b* wholly overlap internal perimeters 39*a* and 39*b* of metal spacer 30, i.e. metal substrate plates 70*a* and 70*b* wholly cover cut-outs 40*a* and 40*b*.

Metal spacer 30 also comprises a plurality of fuel inlet internal perimeters 33*a*, 33*b*, and fuel outlet internal perimeters 33*c*, 33*d* defining fuel ports 34*a*, 34*b*, 34*c* and 34*d*. Each fuel port comprises a number of regions—fuel duct region 44*a*, fuel throat region 44*b*, and fuel distributor channel region 44*c*.

As shown in FIG. 4, first clamping plate 90 is then placed on top of metal spacer 30, i.e. contacts/abuts first surface 31 of metal spacer 30.

First clamping plate 90 defines orifices 92*a* and 92*b*. Spring loaded dowel 84*h* projects through orifice 92*a*, and fixed dowel 83*e* projects through orifice 92*b*, allowing first clamping plate 90 to be aligned with metal spacer 30 (and therefore also with blanking plate 50*a*, metal substrate plate 70*a*, metal substrate plate 70*b* and blanking plate 50*b*).

Clamping means (not shown) clamps first clamping plate 90 and assembly baseplate 80, i.e. clamps metal spacer 30, blanking plate 50*a*, metal substrate plate 70*a*, metal substrate plate 70*b* and blanking plate 50*b*.

First clamping plate also defines welding slots 91*a*, 91*b* and 91*c*.

Welding means (not shown) is used to create line weld seam 100*a* between metal spacer 30 and blanking plate 50*a*, line weld seams 100*b* and 100*c* between metal spacer 30 and metal substrate plate 70*a*, line weld seams 100*d* and 100*e* between metal spacer 30 and metal substrate plate 70*b*, and line weld seam 100*f* between metal spacer 30 and blanking plate 50*b*.

Non-porous region 78*b* of metal substrate plates 70*a*, 70*b* is attached to metal spacer 30.

Blanking plate 50*a*, metal substrate plate 70*a*, metal substrate plate 70*b*, and blanking plate 50*b* attached to metal spacer 30 form/define a metal substrate 65, i.e. a metal substrate 65 attached to metal spacer 30.

First clamping plate 90 is then removed, as shown in FIG. 5 (fixed dowel 83*e* and spring loaded dowels 84*a*, 84*d* and 84*f* are not shown).

As shown in FIG. 6, metal interconnect plate 20 is then placed on top of metal spacer 30.

Second surface 22 of metal interconnect plate 20 is disposed on (i.e. contacts/abuts) first surface 31 of metal spacer 30.

Metal interconnect plate 20 is aligned with metal spacer 30 (and therefore also blanking plate 50*a*, metal substrate plate 70*a*, metal substrate plate 70*b* and blanking plate 50*b*) by fixed dowel 83*e*, spring loaded dowels 84*a*, 84*d*, and 84*f*, and datum edge 81. Spring loaded dowels 84*a* and 84*d* abut first edge 27 of metal interconnect plate 20. Second edge 28 of metal interconnect plate 20 abuts datum edge 81, fixed dowel 83*e*, and spring loaded dowel 84*f*.

Metal interconnect plate 20 comprises a plurality of dimples 110 and elongate bridge dimples 120, 121 which extend outwardly from first surface 21, i.e. away from second surface 22 and away from metal spacer 30 and the metal substrate 65 attached to metal spacer 30.

Dimples 110 are formed in a number of regions including regions corresponding to the location of fuel cells 79 of metal substrate plates 70*a*, 70*b*, such that in a fuel cell stack arrangement comprising a plurality of fuel cell units 1 in a stack, the dimples 110 of a first fuel cell unit 1 contact the fuel cells 79 of an adjacent fuel cell unit 1 with which it is stacked. Thus, the dimples 110 form an electrical connection with the outer (cathode) surface of the fuel cells 79, with electrical current flowing from the first surface 21 of metal interconnect plate 20 to the cathode layer of the adjacent fuel cell/fuel cells 79 of the adjacent fuel cell unit 1.

As described in more detail later, elongate bridge dimples 120, 121 act as fluid flow bridges between separate zones/areas/volumes of the final fuel cell unit 1

As shown in FIG. 7, second clamping plate 95 is then placed on top of metal interconnect plate 20, i.e. contacts/abuts first surface 21 of metal interconnect plate 20.

Second clamping plate 95 defines orifices 98*a* and 98*b*. Spring loaded dowel 84*h* projects through orifice 98*a*, and fixed dowel 83*e* projects through orifice 98*b*, allowing second clamping plate 95 to be aligned with metal interconnect plate 20 (and therefore also with metal spacer 30, blanking plate 50*a*, metal substrate plate 70*a*, metal substrate plate 70*b* and blanking plate 50*b*).

Second clamping plate 95 comprises inner perimeter 96 which defines opening 96*a*.

Clamping means (not shown) clamps second clamping plate 95 and assembly baseplate 80, i.e. clamps metal interconnect plate 20, metal spacer 30, blanking plate 50*a*, metal substrate plate 70*a*, metal substrate plate 70*b* and blanking plate 50*b*.

Welding means (not shown) is used to create a continuous perimeter weld seam 101 between metal interconnect plate 20, metal spacer 30, and blanking plate 50*a*, metal substrate plate 70*a*, metal substrate plate 70*b*, and blanking plate 50*b*.

Second clamping plate 95 is then removed, and the completed metal supported solid oxide fuel cell unit 1 is removed from assembly base plate 80.

In the completed metal supported solid oxide fuel cell unit 1, fuel ducts 130 are defined by fuel ports 24, fuel duct regions 44*a* of fuel ports 34*a*-*d*, all of which are aligned with one another. Fuel ducts 130 extend between first surface 21 of metal interconnect plate 20 and second surface 52 of blanking plates 50*a*, 50*b*.

At first end 2 of fuel cell unit 1 (see e.g. FIG. 3), first volumes (fuel inlet port volumes 35*a*) are defined between first surface 51 of blanking plate 50*a*, fuel inlet internal perimeters 33*a*, 33*b* of metal spacer 30, and second surface 22 of metal interconnect plate 20.

A second volume (a cut-out volume 35*b*) is defined between first surface 71 of metal substrate plate 70*a*, cut-out internal perimeter 39*a* of metal spacer 30, and second surface 22 of metal interconnect plate 20.

A third volume (a cut-out volume 35*b*) is defined between first surface 71 of metal substrate plate 70*b*, cut-out internal perimeter 39*b* of metal spacer 30, and second surface 22 of metal interconnect plate 20.

At second end 3 of fuel cell unit 1, fourth volumes (fuel outlet port volumes 35*c*) are defined between first surface 51 of blanking plate 50*b*, fuel outlet internal perimeters 33*c* and 33*d* of metal spacer 30, and second surface 22 of metal interconnect plate 20.

At first end 2 of fuel cell unit 1, elongate dimples 120 act to define a fluid flow passage between the first and second volumes, i.e. act as fluid flow bridges between the first and second volumes. The fluid flow bridges are the volumes between the elongate dimples 120 and the metal spacer 30.

Elongate dimples 121 act to define a fluid flow passage between the second and third volumes (i.e. between the adjacent cut-out volumes 35*b*). The fluid flow bridges are the volumes between the elongate dimples 121 and the metal spacer 30.

At second end 3 of fuel cell unit 1, elongate dimples 120 act to define a fluid flow passage between the third and fourth volumes, i.e. act as fluid flow bridges between the first and second volumes. The fluid flow bridges are the volumes between the elongate dimples 120 and the metal spacer 30.

Thus, a fluid flow path is defined (using the fuel inlet port volumes 35a, cut-out volumes 35b, fuel outlet port volumes 35c, and fluid flow bridges) from:

(1) fuel duct regions 44a of fuel ports 34a, 34b, to
(2) fuel throat regions 44b of fuel ports 34a, 34b, to
(3) fuel distributor channel regions 44c of fuel ports 34a, 34b, to
(4) elongate dimples 120 at first end 2 of fuel cell unit 1, to
(5) the second volume defined between first surface 71 of metal substrate plate 70a, cut-out internal perimeter 39a of metal spacer 30, and second surface 22 of metal interconnect plate 20, to
(6) elongate dimples 121, to
(7) the third volume defined between first surface 71 of metal substrate plate 70b, cut-out internal perimeter 39b of metal spacer 30, and second surface 22 of metal interconnect plate 20, to
(8) fuel distributor channel regions 44c of fuel ports 34c, 34d, to
(9) fuel throat regions 44b of fuel ports 34c, 34d, to
(10) fuel duct regions 44a of fuel ports 34c, 34d.

Thus, a fluid flow path (i.e. a fuel flow path) is defined within fuel cell unit 1 from fuel ducts 130 at first end 2 to fuel ducts 130 at second end 3.

Suitable material for various components include:

TABLE 1

| metal interconnect late 20 | ferritic stainless steel, grade 441 |
| metal spacer 30 | ferritic stainless steel, grade 441 |
| blanking plates 50a, 50b | Crofer 22 APU (VDM Metals GmbH) |
| metal substrate plates 70a, 70b | Crofer 22 APU (VDM Metals GmbH) |

EMBODIMENT 2

As shown in FIG. 10, Embodiment 2 is as per Embodiment 1, except that in metal supported solid oxide fuel cell unit 1:

(i) blanking plate 50a and metal substrate plate 70a are formed as a combined metal substrate plate 170a, and
(ii) blanking plate 50b and metal substrate plate 70b are formed as a combined metal substrate plate 170b.

Fabrication and operation is otherwise identical to that of Embodiment 1.

EMBODIMENT 3

As per WO2015/136295, a fuel cell stack assembly is formed using a plurality of fuel cell units 1. In more detail, a stack of fuel cell units 1 is assembled on top of a metal base plate (ferritic stainless steel 3CR12), with a Thermiculite 866 gasket electrically insulating the base plate from the adjacent fuel cell unit 1, and a power take off located between the Thermiculite 866 gasket and the adjacent fuel cell unit 1. Thermiculite 866 gaskets are located between the first ends 2 of adjacent fuel cell units 1, and between the second end 3 of adjacent fuel cell units. A power take-off is then positioned upon the top (i.e. the exposed) fuel cell unit 1, a Thermiculite 866 gasket is then placed on top of the power take-off, and a metal end plate (ferritic stainless steel 3CR12) placed upon the Thermiculite gasket. Compressive force is then exerted by compression means between the base plate and the end plate, and a skirt attached to the base plate and the end plate to define a volume between them within which is contained the fuel cell stack and its fuel cell units.

EMBODIMENT 4

As shown in FIG. 11, a fuel cell unit 1 is fabricated as per Embodiment 1. In this embodiment, there are a total of six metal substrate plates 70, and six corresponding cut-outs 40.

Various modifications, adaptations and alternative embodiments will be readily apparent to the person of ordinary skill in the art without departing from the scope of the appended claims. Reference signs are incorporated in the claims solely to ease their understanding, and do not limit the scope of the claims.

REFERENCE SIGNS

1 Metal supported solid oxide fuel cell unit
2 First end
3 Second end
20 Metal interconnect plate
21 First surface (of metal interconnect plate 20)
22 Second surface (of metal interconnect plate 20)
23 External perimeter (of metal interconnect plate 20)
24 Fuel port (of metal interconnect plate 20)
27 First edge (of metal interconnect plate 20)
28 Second edge (of metal interconnect plate 20)
30 Metal spacer
31 First surface (of metal spacer 30)
32 Second surface (of metal spacer 30)
33 External perimeter (of metal spacer 30)
33a Fuel inlet internal perimeter
33b Fuel inlet internal perimeter
33c Fuel outlet internal perimeter
33d Fuel outlet internal perimeter
34a Fuel port
34b Fuel port
34c Fuel port
34d Fuel port
35a Fuel inlet port volume
35b Cut-out volume
35c Fuel outlet port volume
37 First elongate edge (of metal spacer 30)
38 Second elongate edge (of metal spacer 30)
39a Cut-out internal perimeter
39b Cut-out internal perimeter
40 Cut-out
40a Cut-out
40b Cut-out
41 Cross member
44a Fuel duct region
44b Fuel throat region
44c Fuel distributor channel region
50a Blanking plate
50b Blanking plate
51 First surface (of blanking plate)
52 Second surface (of blanking plate)
54 Fuel port (of blanking plate)
55 Curved edge (of blanking plate)
57 First edge (of blanking plate)
58 Second edge (of blanking plate)
59 Inner edge (of blanking plate)
65 Metal substrate
70 Metal substrate plate
70a Metal substrate plate
70b Metal substrate plate 71 First surface (of metal substrate plate)
72 Second surface (of metal substrate plate)
74 First short side (of metal substrate plate)
75 Second short side (of metal substrate plate)
76 Outer long side (of metal substrate plate)
77 Inner long side (of metal substrate plate)
78 Porous region (of metal substrate plate)
78a Perforation
78b Non-porous region (of metal substrate plate)
79 Solid oxide fuel cell
80 Assembly baseplate
81 Datum edge
82a Tolerance gap
82b Tolerance gap
82c Tolerance gap
83a Fixed dowel
83b Fixed dowel
83c Fixed dowel
83d Fixed dowel
83e Fixed dowel
83f Fixed dowel
83g fixed dowel
84a Spring loaded dowel
84b Spring loaded dowel
84c Spring loaded dowel
84d Spring loaded dowel
84e Spring loaded dowel
84f Spring loaded dowel
84g Spring loaded dowel
84h Spring loaded dowel
90 First clamping plate
91a Welding slot
91b Welding slot
91c Welding slot
92a Orifice
92b Orifice
95 Second clamping plate
96 Inner perimeter
96a Opening
98a Orifice
98b Orifice
100a Line weld seam
100b Line weld seam
100c Line weld seam
100d Line weld seam
100e Line weld seam
100f Line weld seam
101 Perimeter weld seam
110 Dimple
120 Elongate bridge dimple
121 Elongate bridge dimple
130 Fuel duct
170a Combined metal substrate plate
170b Combined metal substrate plate

The invention claimed is:

1. A metal supported solid oxide fuel cell unit comprising:
a) a plurality of metal substrate plates and at least two blanking plates, each metal substrate plate defining first and second opposed surfaces and each blanking plate defining first and second opposed surfaces, wherein at least one solid oxide fuel cell is disposed on said second surface of each metal substrate plate;
b) a metal spacer, which defines first and second opposed surfaces, said metal spacer comprising an external perimeter and a plurality of cut-out internal perimeters, each cut-out internal perimeter defining a cut-out, wherein said first surface of each metal substrate plate and said first surface of each blanking plate is attached to said second surface of said metal spacer, each cut-out internal perimeter of said metal spacer being wholly overlapped by a respective one of the plurality of metal substrate plates;
c) a metal interconnect plate which defines first and second opposed surfaces, said second surface of said metal interconnect plate sealingly attached to said first surface of said metal spacer; and
d) wherein at least one said blanking plate and at least one said metal substrate plate are formed as separate metal plate components.

2. A metal supported solid oxide fuel cell unit according to claim 1, wherein said metal supported solid oxide fuel cell unit is a metal supported solid oxide fuel cell stack layer.

3. A metal supported solid oxide fuel cell unit according to claim 1, wherein each metal substrate plate is attached to said metal spacer between a cut-out internal perimeter and said external perimeter.

4. A metal supported solid oxide fuel cell unit according to claim 3, wherein each metal substrate plate comprises a porous region surrounded by a non-porous region, and said non-porous region of each metal substrate plate is attached to said metal spacer.

5. A metal supported solid oxide fuel cell unit according to claim 1, wherein said metal interconnect plate is sealingly attached to said first surface of said metal spacer between said external perimeter of said metal spacer and said plurality of cut-out internal perimeters of said metal spacer.

6. A metal supported solid oxide fuel cell unit according to claim 1, wherein each metal substrate plate is attached to said metal spacer by means of welding.

7. A metal supported solid oxide fuel cell unit according to claim 1, comprising at least one combined metal substrate plate, each combined metal substrate plate comprising a blanking plate and at least one metal substrate plate.

8. A solid oxide fuel cell stack comprising a plurality of metal supported solid oxide fuel cell units according to claim 1.

9. A solid oxide fuel cell stack assembly comprising: a base plate, an end plate, a solid oxide fuel cell stack according to claim 8, and a skirt attached to said base plate and said end plate and defining a volume between said skirt, said base plate and said end plate within which is contained said fuel cell stack.

10. A method of assembly of a metal supported solid oxide fuel cell unit, said metal supported solid oxide fuel cell unit comprising:
a) a plurality of metal substrate plates and at least two blanking plates, each metal substrate plate defining first and second opposed surfaces and each blanking plate defining first and second opposed surfaces, wherein at least one solid oxide fuel cell is disposed on said second surface of each metal substrate plate;
b) a metal spacer, which defines first and second opposed surfaces, said metal spacer comprising an external perimeter and a plurality of cut-out internal perimeters, each cut-out internal perimeter defining a cut-out; and
c) a metal interconnect plate which defines first and second opposed surfaces;
said method of assembly comprising the steps of:
(i) attaching said first surface of each metal substrate plate and said first surface of each blanking plate to said second surface 32 of said metal spacer, wherein each cut-out internal perimeter of said metal spacer is wholly overlapped by a respective one of the plurality of metal substrate plates;

wherein at least one said blanking plate and at least one said metal substrate plate are formed as separate metal plate components; and (ii) sealingly attaching said second surface of said metal interconnect plate to said first surface of said metal spacer.

11. A method of assembly of a metal supported solid oxide fuel cell unit according to claim 10, wherein step (i) comprises clamping said metal spacer to said at least two blanking plates and said plurality of metal substrate plates and attaching said metal spacer to said at least two blanking plates and said plurality of metal substrate plates.

12. A method of assembly of a metal supported solid oxide fuel cell unit according to claim 10, wherein step (ii) comprises clamping said metal interconnect plate to said metal spacer and attaching said metal interconnect plate to said metal spacer.

13. A method of assembly of a metal supported solid oxide fuel cell unit according to claim 11, wherein at least step (i) comprises attaching by welding.

14. A method of assembly of a metal supported solid oxide fuel cell unit according to claim 10, wherein said plurality of metal substrate plates and said plurality of blanking plates are aligned with said metal spacer and aligned with said metal interconnect plate.

15. A method of assembly of a metal supported solid oxide fuel cell unit according to claim 12, wherein at least step (ii) comprises attaching by welding.

16. A metal supported solid oxide fuel cell unit according to claim 1, wherein the metal substrate plates are arranged in a 2×1 linear arrangement between the blanking plates or wherein the metal substrate plates are arranged in a 1×2 parallel arrangement between the blanking plates.

17. A metal supported solid oxide fuel cell unit according to claim 1, wherein the metal substrate plates are arranged in one of the following arrangements between the blanking plates: 2×2, 3×2, 2×3, 3×3, 4×2, 4×3.

18. A metal supported solid oxide fuel cell unit according to claim 1, wherein just two blanking plates are provided, arranged at either end of the plurality of metal substrate plates.

19. A metal supported solid oxide fuel cell unit according to claim 1, wherein said plurality of metal substrate plates and said at least two blanking plates attached to said metal spacer together define a metal substrate attached to said metal spacer, and said metal substrate plates and said blanking plates do not contact one another.

20. A metal supported solid oxide fuel cell unit according to claim 1, wherein all said blanking plates and metal substrate plates are formed as separate metal plate components.

* * * * *